(12) United States Patent
Aonuma

(10) Patent No.: US 8,537,412 B2
(45) Date of Patent: Sep. 17, 2013

(54) PRINTING CONTROL DEVICE

(75) Inventor: Koki Aonuma, Nagoya (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 930 days.

(21) Appl. No.: 12/627,464

(22) Filed: Nov. 30, 2009

(65) Prior Publication Data

US 2010/0141967 A1    Jun. 10, 2010

(30) Foreign Application Priority Data

Dec. 9, 2008    (JP) ................... 2008-313228

(51) Int. Cl.
*G06K 15/02*    (2006.01)

(52) U.S. Cl.
USPC ........... 358/1.2; 358/1.8; 358/3.06; 358/3.13; 358/3.03; 358/3.14; 358/534; 358/535; 358/536; 382/251; 382/232; 382/237

(58) Field of Classification Search
None
See application file for complete search history.

(56) References Cited

U.S. PATENT DOCUMENTS

| | | | | |
|---|---|---|---|---|
| 5,550,647 | A | * | 8/1996 | Koike .......................... 358/3.03 |
| 6,072,906 | A | * | 6/2000 | Sato ............................. 382/237 |
| 6,191,868 | B1 | | 2/2001 | Shibuya et al. |
| 7,477,422 | B2 | * | 1/2009 | Konno et al. ................ 358/3.06 |
| 7,948,659 | B2 | * | 5/2011 | Shibuya et al. .............. 358/3.13 |
| 2003/0151774 | A1 | * | 8/2003 | Washio ........................ 358/3.13 |
| 2005/0068554 | A1 | * | 3/2005 | Yoshida .......................... 358/1.9 |
| 2007/0046999 | A1 | | 3/2007 | Shibuya et al. |
| 2008/0259361 | A1 | * | 10/2008 | Kakutani ........................ 358/1.8 |

FOREIGN PATENT DOCUMENTS

| | | |
|---|---|---|
| JP | 1-251955 | 10/1989 |
| JP | 6-227048 | 8/1994 |
| JP | 8-130643 | 5/1996 |
| JP | 9-247438 | 9/1997 |
| JP | 2000-004359 | 1/2000 |
| JP | 2007-060111 | 3/2007 |

OTHER PUBLICATIONS

Japanese Official Action dated Sep. 28, 2010 with partial English translation.

* cited by examiner

*Primary Examiner* — Hilina K Demeter
(74) *Attorney, Agent, or Firm* — Scully, Scott, Murphy & Presser, P.C.

(57) ABSTRACT

A printing control device includes an input image data acquiring unit, a threshold acquiring unit, a determining unit, and a generating unit. The input image data acquiring unit acquires input image data. The input image data includes a plurality of input pixel data. Each input pixel data has an input value. The determining unit determines, for each input pixel data, a difference related value based on a difference between the input value and a threshold value corresponding to the input value. The generating unit generates print data by generating, for each input pixel data, output pixel data based on the difference related value. The output pixel data expresses density corresponding to the difference related value.

13 Claims, 10 Drawing Sheets

FIG.7(a)

INTERMEDIATE PATTERN TABLE

| RANGE OF DIFFERENCE BETWEEN INPUT VALUE AND THRESHOLD VALUE | INTERMEDIATE PATTERN |
|---|---|
| 10 ~ | ●● / ●● (P1) |
| 5 ~ 10 | ●● / ●○ (P2) |
| 1 ~ 5 | ○● / ●○ (P3) |
| 0 ~ 1 | ●○ / ●○ (P4) |
| −5 ~ 0 | ○○ / ○● (P5) |
| ~ −5 | ○○ / ○○ (P6) |

FIG.7(b)

OUTPUT PATTERN TABLE

| INTERMEDIATE PATTERN | OUTPUT PATTERN |
|---|---|
| ●● / ●● (P1) | 1111 |
| ●● / ●○ (P2) | 1110 |
| ○● / ●○ (P3) | 0110 |
| ●○ / ●○ (P4) | 1010 |
| ○○ / ○● (P5) | 0001 |
| ○○ / ○○ (P6) | 0000 |

INPUT IMAGE DATA
600ppi × 600ppi

DITHER MATRIX
600ppi × 600ppi

1200ppi × 1200ppi

600dpi × 2400dpi

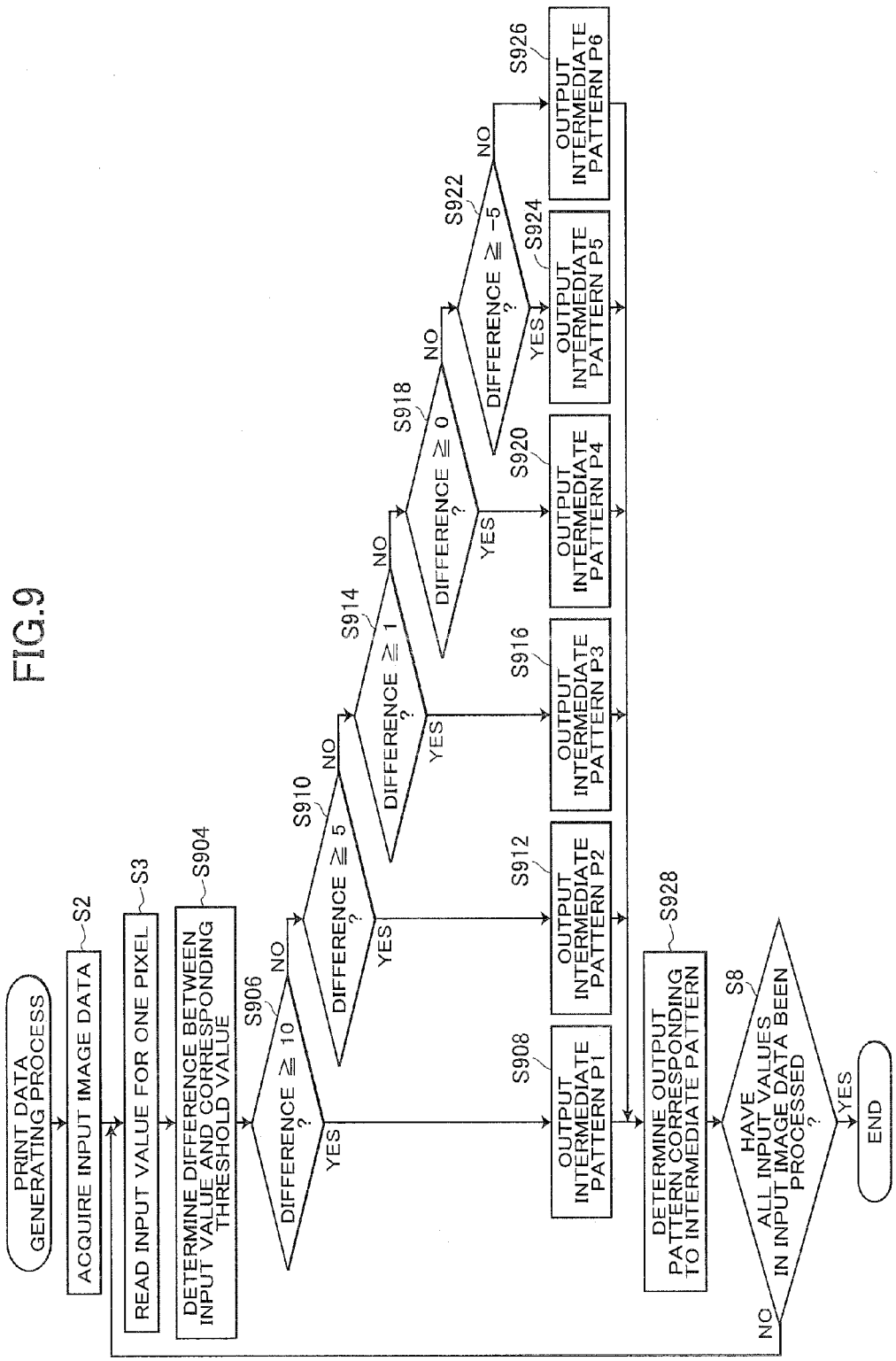

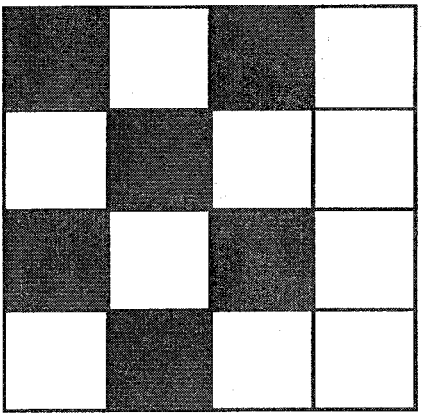
FIG.10(a) INPUT IMAGE DATA PRIOR ART
FIG.10(b) DITHER MATRIX PRIOR ART
FIG.10(c) OUTPUT IMAGE PRIOR ART

PRINTING CONTROL DEVICE

CROSS REFERENCE TO RELATED APPLICATION

This application claims priority from Japanese Patent Application No. 2008-313228 filed Dec. 9, 2008. The entire content of the priority application is incorporated herein by reference.

TECHNICAL FIELD

The present invention relates to a printing control device.

BACKGROUND

One common technique for reproducing grayscale images on a printer is dithering, a binarization process for generating binary image data indicating whether dots are on or off (whether to form or not form dots) from multi-level image data by comparing an input value (grayscale value expressed as one of 256 levels, for example) of each pixel included in multi-level input image data, and a threshold value set for each element of a dither matrix. Using this method, it is determined that a dot will be formed for a pixel when the input value of the pixel is at least as large as the corresponding threshold value in the dither matrix, and that a dot will not be formed when the input value of the pixel is less than the corresponding threshold value. By forming dots on recording paper based on this binary image data, a printer can print on recording paper an image having gradations expressed by the occurrence rate of dots.

However, dithering does not account for the magnitude of difference between input values of pixels and their corresponding threshold values. Therefore, this technique is problematic because the gradations of the image cannot be reproduced with accuracy.

A conventional image process using dithering will be described with referring to FIGS. 10(a) through 10(c). In an example of input image data shown in FIG. 10(a), input values become larger toward the top of the image and smaller toward the bottom. In other words, this input image data represents an input image that grows gradually lighter from top to bottom. When this input image data is binarized according to conventional dithering, the gradations of the input image are not always reproduced in the output image, as illustrated in FIG. 10(c). This problem can occur because binarizing input values according to conventional dithering will uniformly set dots to ON when input values are larger than the corresponding threshold values, regardless of whether the input values are much larger than the threshold values or only slightly larger than the threshold values, and will uniformly set dots to OFF when input values are smaller than the corresponding threshold values, regardless of whether the input values are slightly smaller than the threshold values or much smaller than the threshold values. In other words, this method ignores the magnitude of difference between the input values and their corresponding threshold values.

In addition to dithering, the error diffusion method has been used as a technique for binarizing input values of pixels in input image data. The error diffusion technique can reproduce more subtle levels of gradation than the dithering technique, because error diffusion distributes the differences between pixel input values and threshold values to peripheral pixels. However, the shortcoming of the error diffusion method is the large processing load required.

SUMMARY

In view of the foregoing, it is an object of the present invention to provide a technique for reproducing gradations of an input image with relatively good accuracy while requiring a relatively smaller processing load.

In order to attain the above and other objects, the invention provides a printing control device including an input image data acquiring unit, a determining unit, and a generating unit. The input image data acquiring unit acquires input image data. The input image data includes a plurality of input pixel data. Each input pixel data has an input value. The determining unit determines, for each input pixel data, a difference related value based on a difference between the input value and a threshold value corresponding to the input value. The generating unit generates print data by generating, for each input pixel data, output pixel data based on the difference related value. The output pixel data expresses density corresponding to the difference related value.

According to another aspect, the present invention provides a printing control method comprising: acquiring input image data, the input image data including a plurality of input pixel data, each input pixel data having an input value; determining, for each input pixel data, a difference related value based on a difference between the input value and a threshold value corresponding to the input value; and generating, for each input pixel data, output pixel data based on the difference related value, the output pixel data expressing density corresponding to the difference related value.

According to another aspect, the present invention provides a computer-readable recording medium that stores a printing control program, the printing control program comprising instructions for: acquiring input image data, the input image data including a plurality of input pixel data, each input pixel data having an input value; determining, for each input pixel data, a difference related value based on a difference between the input value and a threshold value corresponding to the input value; and generating, for each input pixel data, output pixel data based on the difference related value, the output pixel data expressing density corresponding to the difference related value.

BRIEF DESCRIPTION OF THE DRAWINGS

The particular features and advantages of the invention as well as other objects will become apparent from the following description taken in connection with the accompanying drawings, in which:

FIG. 7(*a*) shows an example of intermediate pattern table stored in a printing control unit according to a third embodiment;

FIG. 7(*b*) shows an example of output pattern table stored in the printing control unit according to the third embodiment;

FIG. 8(*b*) is an explanatory diagram showing a part of dither matrix;

FIG. 8(*c*) is an explanatory diagram showing a part of intermediate pattern determined by the input image data shown in FIG. 8(*a*) and the dither matrix shown in FIG. 8(*b*);

FIG. 8(*d*) is an explanatory diagram showing a part of print data generated based on the intermediate pattern data shown in FIG. 8(*c*);

FIG. 9 is a flowchart illustrating steps in a print data generating process executed by the printing control device according to the third embodiment;

FIG. 10(*a*) shows an example of input image data;

FIG. 10(*b*) shows an example of a dither matrix; and

FIG. 10(*c*) shows an output image generated based on the input image data shown in FIG. 10(*a*) and the dither matrix shown in FIG. 10(*c*) according to conventional dithering.

DETAILED DESCRIPTION

Figure 1:
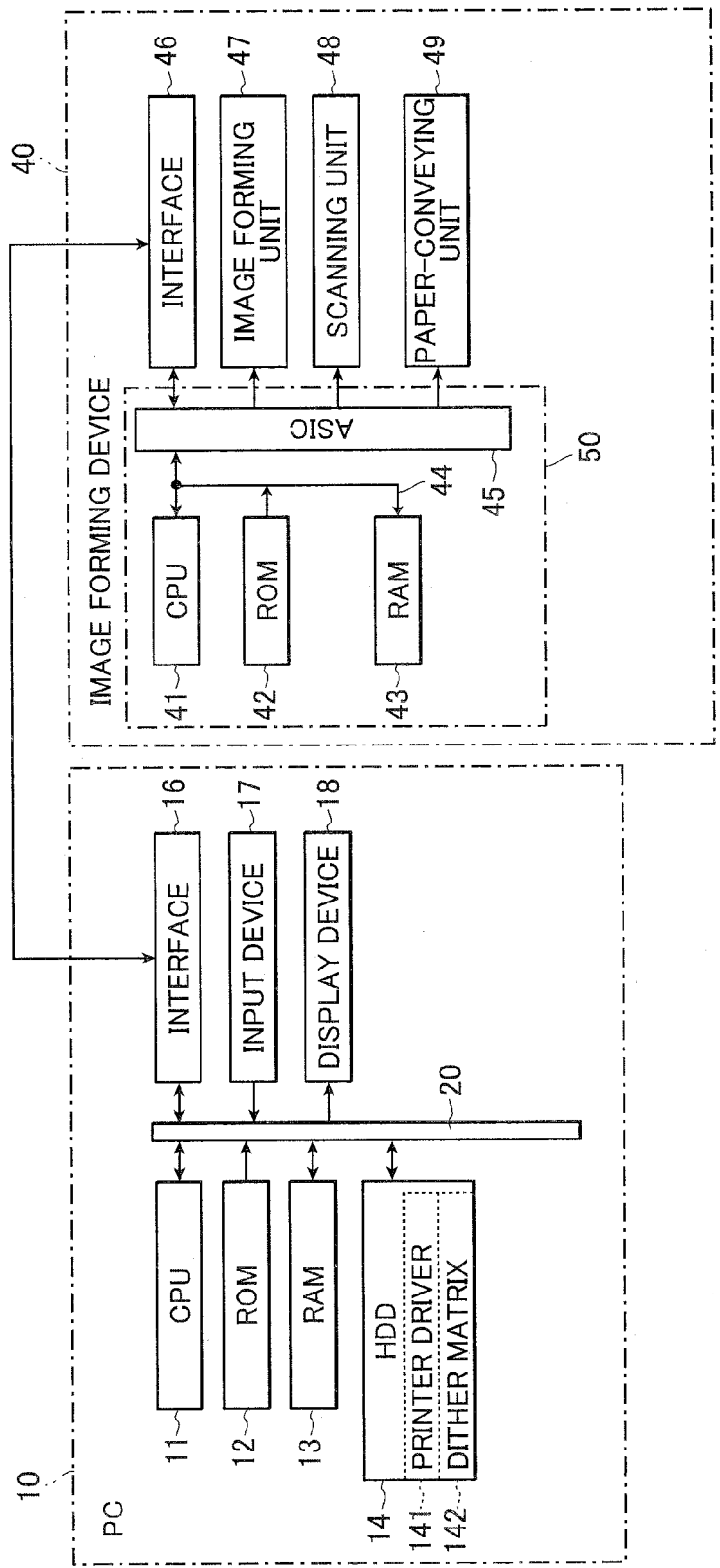
FIG. 1 is a block diagram showing a printing control device according to a first embodiment of the present invention.

As shown in FIG. 1, a printing system 1 includes a personal computer 10 (PC 10) and a printer 40. The PC 10 includes a CPU 11, a ROM 12, a RAM 13, a hard disk drive (HDD) 14, an interface 16, an input device 17, and a display device 18. These components are connected to each other via a bus line 20.

The CPU 11 performs overall control of the PC 10 based on fixed values and programs stored in the ROM 12, the RAM 13, and the HDD 14. The ROM 12 stores programs for controlling various operations of the PC 10. The RAM 13 is a rewritable memory for temporarily storing various data used when the CPU 11 executes the above programs.

Figure 3:
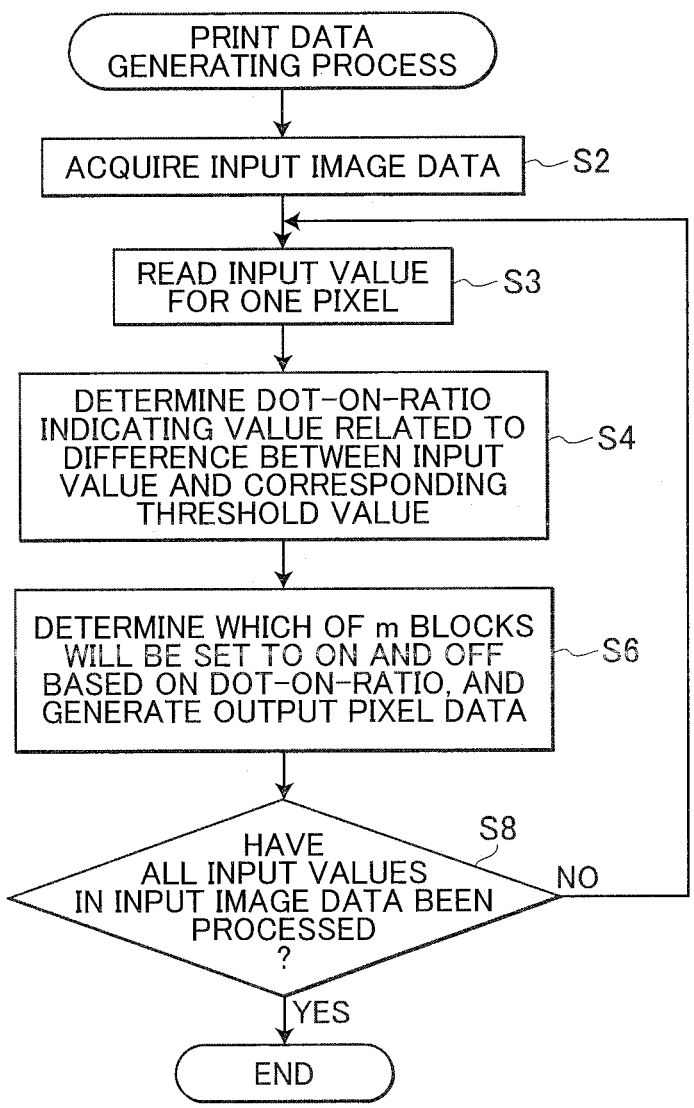
FIG. 3 is a flowchart illustrating steps in a print data generating process executed by the printing control device according to the first embodiment.
Figure 4:
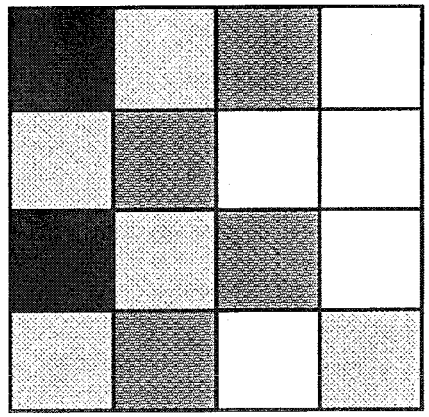
FIG. 4(a) shows an example of input image data.
FIG. 4(b) shows an example of a dither matrix.
FIG. 4(c) shows an output image generated based on the input image data shown in FIG. 4(a) and the dither matrix shown in FIG. 4(c)

The HDD 14 stores a printer driver 141 and dither matrix 142 shown in FIG. 4. The printer driver 141 stores and executes a program for implementing a print data generating process shown in the flowcharts of FIG. 3 together with CPU 11. The interface 16 transmits data to the printer 40. The input device 17 enables a user of the PC 10 to input instructions, and is configured of such as a keyboard, mouse, and the like. The display device 18 is capable of displaying various information representing contents of various process and inputted data.

The printer 40 is a laser printer and includes a control unit 50. The control unit 50 includes a CPU 41 serving as a microprocessor, a ROM 42 storing various control programs and data, a RAM 43, and application specific integrated circuit (AISC) 45. These components are connected to each other via a bus line 44. The CPU 41 executes the programs for controlling various operations stored in the ROM 42. The RAM 43 is a rewritable memory for storing print data and control signals transmitted from the PC 10.

The ASIC 45 is connected to an interface 46 that functions to transmit and receive from an external device such as a computer and a digital camera via a USB cable (not shown), an image forming unit 47, a scanning unit 48, and a paper-conveying unit 49.

While not shown in the drawings, the image-forming unit 47 is provided with photosensitive drums, charging devices for uniformly charging the surfaces of the photosensitive drums, and developer cartridges accommodating toner. In order to facilitate understanding of the invention, the printer 40 of the first embodiment will be described as a printer that prints monochrome images using black toner.

When the PC 10 provides print data to the printer 40 via the interface 46, the control unit 50 of the printer 40 generates a pulse-width modulation (PWM) signal based on bitmap data included in the print data and outputs this signal to the scanning unit 48. The PWM signal serves to control the on/off timing and to vary the emission time of a laser beam in the scanning unit 48. Thus, the scanning unit 48 scans a laser beam over the surface of the photosensitive drum that has been uniformly and positively charged by the charging device while switching the laser on and off based on the PWM signal. The irradiated laser beam partially removes the electrical charge from the surface of the photosensitive drum to form micro-spots thereon. The scanning unit 48 forms an electrostatic latent image on the surface of the photosensitive drum that corresponds to the image to be printed on recording paper by depositing positively charged toner in regions of the surface where the electrical charge has been removed. The scanning unit 48 then prints an image on a sheet of recording paper conveyed by the paper-conveying unit 49 by transferring the toner from the photosensitive drum to the recording paper and fixing the toner to the paper.

When the user of the PC 10 specifies original image data to be printed and issues a print command, the PC 10 converts this original image data (RGB data) to input image data (K data) representing the input values for each pixel by first converting the ROB values for each pixel constituting the original image data to brightness values (Y) and by further converting these brightness values to input values (gradation values) representing the grayscale (density) of black (K). In the description of the first embodiment, an image corresponding to the input image data will be referred to as an "input image," and the pixels constituting the input image will be referred to as "input pixels." Further, a set of data representing the input pixel will be referred to as "input pixel data".

By performing a print data generation process described later with reference to FIG. 3, the PC 10 can convert the input image data to binary output image data indicating which dots are turned on or turned off (to be formed or not to be formed), for example, which output image data can be rendered on the printer 40, and outputs the output image data to the printer 40 as print data. The printer 40 prints an image corresponding to the input image based on this output image data. In the description of the first embodiment, an image printed by the printer 40 will be referred to as an "output image," and pixels constituting the output image will be referred to as "output pixels." Also, a set of data representing the output image will be referred to as "print data" and a set of data representing the output pixel will be referred to as "output pixel data". Further, the output pixels will denote unit pixels having a one-on-one correspondence with the input pixels, which are the smallest units constituting the input image.

Figure 2:
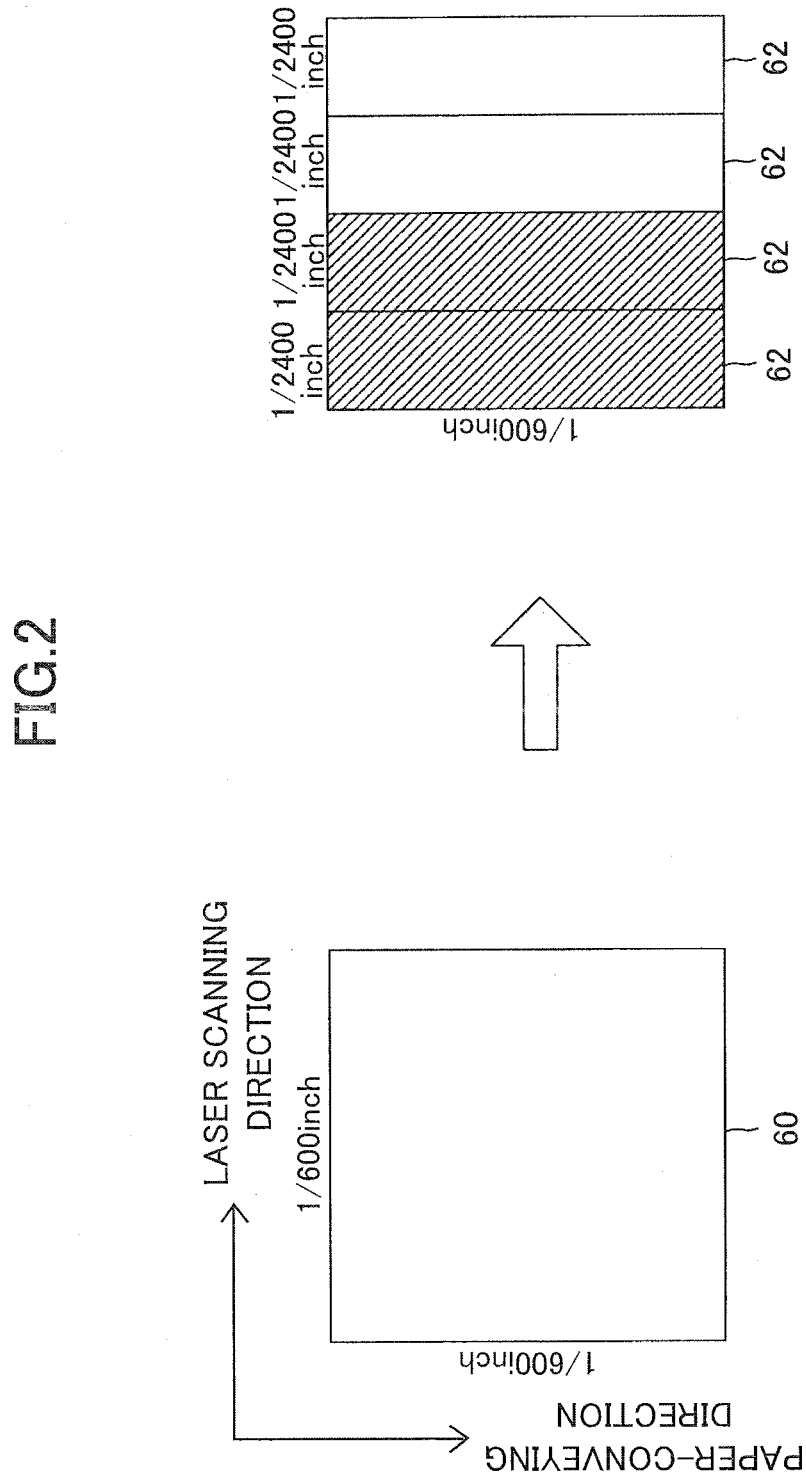
FIG. 2 is conceptual diagram illustrating a relationship between an output pixel and density that can be expressed in the output pixel.

Next, the output pixels formed by the printer 40 will be described with reference to FIG. 2. In FIG. 2, a single output pixel covers a region 60. The region 60 is divided into m blocks 62 along the laser scanning direction. The number m may be an integer greater than 1, m is set to 4 in an example shown in FIG. 2. When forming each output pixel, the printer 40 independently controls whether each block 62 is turned on or off. Here "block" represents the smallest unit that the printer 40 can individually set to be turned on or off (i.e., the smallest unit that the printer can print). In FIG. 2, blocks 62 set to on have been shaded, while those set to off have not.

With a laser printer, it is relatively easy to control whether dots are turned on or off in units of blocks 62 that are defined by dividing the region 60 corresponding to an output pixel by m, by varying the laser emission time along the laser scanning direction based on the PWM signal. Therefore, even if the resolution for blocks in the direction orthogonal to the laser scanning direction (i.e., the paper-conveying direction) were limited to 1/600 inches, the laser printer would be able independently to control the on/off settings of 1/2400-inch blocks in the laser scanning direction, for example (for the case in which m=4).

Hence, by dividing a single output pixel into four blocks 62 in the laser scanning direction and controlling which of the blocks 62 is on and off (formed and not formed) as illustrated in FIG. 2, the single output pixel can be rendered in a plurality of densities, where "density" denotes the degree of lightness or darkness. Increasing the percentage of the colored region (i.e., the region in which toner is deposited) per unit area is equivalent to increasing the density, while conversely decreasing the percentage of the colored region per unit area is equivalent to decreasing the density. In other words, an output pixel can be rendered at a higher density (i.e., made darker) by increasing the number of blocks 62 in the output pixels that are formed, and conversely the output pixel can be rendered at a lower density (i.e., made lighter) by decreasing the number of blocks 62 that are formed.

While this process will be described in greater detail with reference to FIGS. 3 through 4(c), the PC 10 according to the first embodiment generates print data by generating, for each input pixel data, output pixel data indicating which dots are set to on with blocks 62 whose number corresponds to a dot-on-ratio described later and transmits this print data to the printer 40. By individually controlling which of the blocks 62 are formed and not formed based on the print data, the printer 40 can print an output image that reproduces gradations in each output pixel with accuracy.

While the region 60 covered by a single output pixel in FIG. 2 is divided into four blocks 62 for simplification, the number of divisions m may be an integer greater than or equal to 2 and may be set to a larger number if the laser mechanism in the printer 40 can support this greater number of divisions. For example, by setting m to 256, 256 gradations (0-255) can be expressed in a single output pixel.

Next, a print data generating process executed on the PC 10 will be described with reference to FIGS. 3 through 4(c). The CPU 11 implements the print data generating process shown in FIG. 3 by executing the printer driver 141. Further, the CPU 11 begins the print data generating process when the user of the PC 10 specifies original image data to be printed and issues a print command.

In S2 the CPU 11 acquires input image data corresponding to the specified original image data. In other words, in S2 the CPU 11 converts ROB values for each pixel in the original image data (RGB data) to brightness values (Y) and further converts these brightness values to input values expressing a gradation (density) of black (K) to acquire input image data (K data).

FIG. 4(a) conceptually illustrates input image data, with each square representing an input pixel and the number within the square representing the input value for the corresponding input pixel, i.e., input pixel data. The input image data includes a plurality of sets of input pixel data. Each input pixel data has an input value. In this example, the PC 10 will process each input value as four bits worth of data. The input values are rendered in decimal form in FIG. 4(a), and larger input values indicate input pixels with denser colors.

Returning to FIG. 3, in S3 the CPU 11 reads or acquires an input value for one input pixel data. In S4 the CPU 11 references the dither matrix 142 and acquires a value assigned to a corresponding element in the dither matrix 142 as the threshold value corresponding to the input pixel data, and determines a dot-on-ratio to indicate a value related to the difference between the input value and the corresponding threshold value.

As shown in FIG. 4(b), the dither matrix 142 is a 4×4 matrix having 16 elements. Each element is assigned a threshold value ranging from a minimum value of 1 to a maximum value of 15 from among the possible input values of 0-15, excluding 0. Each value from 1 through 14 is assigned uniquely to one element in the matrix, but the maximum value of 15 is assigned to two elements in the example of FIG. 4(b) since there are 16 elements. Each input pixel data constituting the input image data corresponds to one element of the dither matrix 142. The CPU 11 compares the input value of the input pixel data to the threshold value assigned to the corresponding element in the dither matrix 142.

Using dithering well known in the art, the CPU 11 converts the input value to a binary value by setting the input value to a value indicating "on" when the input value is greater than or equal to the threshold value, and by setting the input value to a value indicating "off" when the input value is less than the threshold value. Through this process, the difference between the input value and threshold value is ignored and not reflected in the density of the output image.

Therefore, in the first embodiment, the CPU 11 determines a dot-on-ratio related to the difference between the input value and the corresponding threshold value in the dither matrix 142 (input value−threshold value) and adjusts the density of the output image based on the dot-on-ratio. The dot-on-ratio is calculated using Equations (1) and (2) below, for example.

When maximum input value−threshold≠0, dot-on-ratio={(input value−threshold)/[maximum input value−threshold×(maximum input value−threshold)/maximum input value]+constant}× coefficient  (1)

When maximum input value−threshold=0, dot-on-ratio=0  (2)

Through Equations (1) and (2) above, the dot-on-ratio determined by the CPU 11 increases as the value obtained by subtracting the threshold value from the input value (input value−threshold value) increases. The maximum input value in Equations (1) and (2) denotes the largest possible input value (the base 10 value of 15, when the input value is expressed in four-bit data). The constant and coefficient in Equation (1) are set so that the dot on ratio is a value between 0 and 1.

In the first embodiment, the CPU 11 generates output pixel data so that a larger number of blocks 62 (see FIG. 2) are set to on within the output pixel when the corresponding dot-on-ratio is set to a higher value in S4 in order to render a darker output pixel.

After calculating the dot-on-ratio in S4, in S6 the CPU 11 determines which of the m blocks 62 will be set to on and off so that the number set to on corresponds to the dot-on-ratio, and subsequently develops bitmap data indicating which of the m blocks 62 is turned on or off in a page memory of the RAM 13 (see FIG. 1). In other words, the CPU 11 generates the output pixel data indicating whether to turn on or off each of the plurality blocks and including turned-on blocks whose number corresponds to the dot-on-ratio. Specifically, if the dot-on-ratio calculated in Equations (1) and (2) is r, the CPU 11 generates bitmap data as output pixel data and develops the bitmap data in the page memory so that m×r of the m blocks constituting the single output pixel are set to on. For example, if m is 256 and the dot-on-ratio is 0.5, the CPU 11 sets 128 of the 256 blocks (256×0.5) to on. If m is 4 and the dot-on-ratio is 0.5, the CPU 11 sets 2 of the 4 blocks (4×0.5) to on.

In S8 the CPU 11 determines whether or not the above process has been completed for all input values in the input image data. If the process has not been performed for all input values (S8: NO), the CPUs 11 returns to S3 and repeats the process described above. When the process has been completed for all input values (S8: YES), the CPU 11 ends the print data generating process. At the time, the CPU 11 generates print data by generating, for each input pixel data, output pixel data based on the dot-on-ratio. The plurality of sets of output pixel data consist the print data. Each output pixel data is generated based on each input pixel data, and expresses density corresponding to the dot-on-ratio. After completing the print data generating process described above, the CPU 11 transmits the bitmap data developed in the page memory to the printer 40 as print data.

In the first embodiment, the CPU 11 generates print data so that output pixels corresponding to the input pixels are formed at a density corresponding to the respective dot-on-ratios, where the dot-on-ratios reflect the differences between the input values expressing the gradations of the input pixels and the threshold values corresponding to these input pixels. Since the printer 40 prints an output image based on the print data generated through the print data generating process by forming output pixels at densities associated with the differences between the input values of corresponding input pixel data and the threshold values, the user can obtain an output image in which the gradations of the input pixels are reproduced accurately.

FIG. 4(c) conceptually illustrates an example of output image printed by the printer 40 based on print data that was generated using the input image data shown in FIG. 4(a) and the dither matrix 142 shown in FIG. 4(b). As described with reference to FIG. 2, the printer 40 of the first embodiment can vary the density of each output pixel by the number of blocks 62 in the output pixel that are set to on. Hence, each output pixel is configured of parts in which toner is deposited (parts in which dots are formed) and parts in which toner is not deposited (parts in which dots are not formed), as indicated in the enlarged view of FIG. 2. However, the overall differences in toner coverage are perceived as a gradation of the color to the human eye. Hence, the density of each output pixel is indicated as a shade of gray in FIG. 4(c).

In the example of FIG. 4(a), the input values of the input image data grow larger toward the top and smaller toward the bottom. In other words, this input image data corresponds to an input image that grows gradually lighter toward the bottom. By performing the print data generating process of the first embodiment, the PC 10 can reproduce these subtle gradations of the input image in the output image, as shown in FIG. 4(c). Through the print data generating process in the first embodiment, the CPU 11 can generate output image data corresponding to the output image reproducing these subtle gradations because the difference between the input value of each input pixel data and its corresponding threshold value is not discarded but is used to determine the density of the corresponding output pixel.

Moreover, the PC 10 according to the first embodiment can perform the print data generating process quickly since the dot-on-ratios are determined using threshold values assigned to each element of the dither matrix 142 having a one-on-one correspondence to the input pixel data.

Further, in the print data generating process of the first embodiment, the dot-on-ratio related to the difference between an input value of the input pixel data and its threshold value is only reflected in the density of the corresponding output pixel. Accordingly, the print data generating process places less processing load on the PC 10 of the first embodiment than an error diffusion method in which the difference between an input value and its threshold value is distributed among peripheral pixels.

Next, a second embodiment of the present invention will be described with reference to FIGS. 5 and 6. In the first embodiment described above, the PC 10 calculates, for each input pixel data, a dot-on-ratio related to the difference between an input value and a threshold value to determine which of the m blocks 62 in the corresponding output pixel are to be set on and off. In contrast, the PC 10 according to the second embodiment determines which of the m blocks 62 is turned on and off based on a range of values in which the difference between the input value and threshold value falls.

Figure 5:
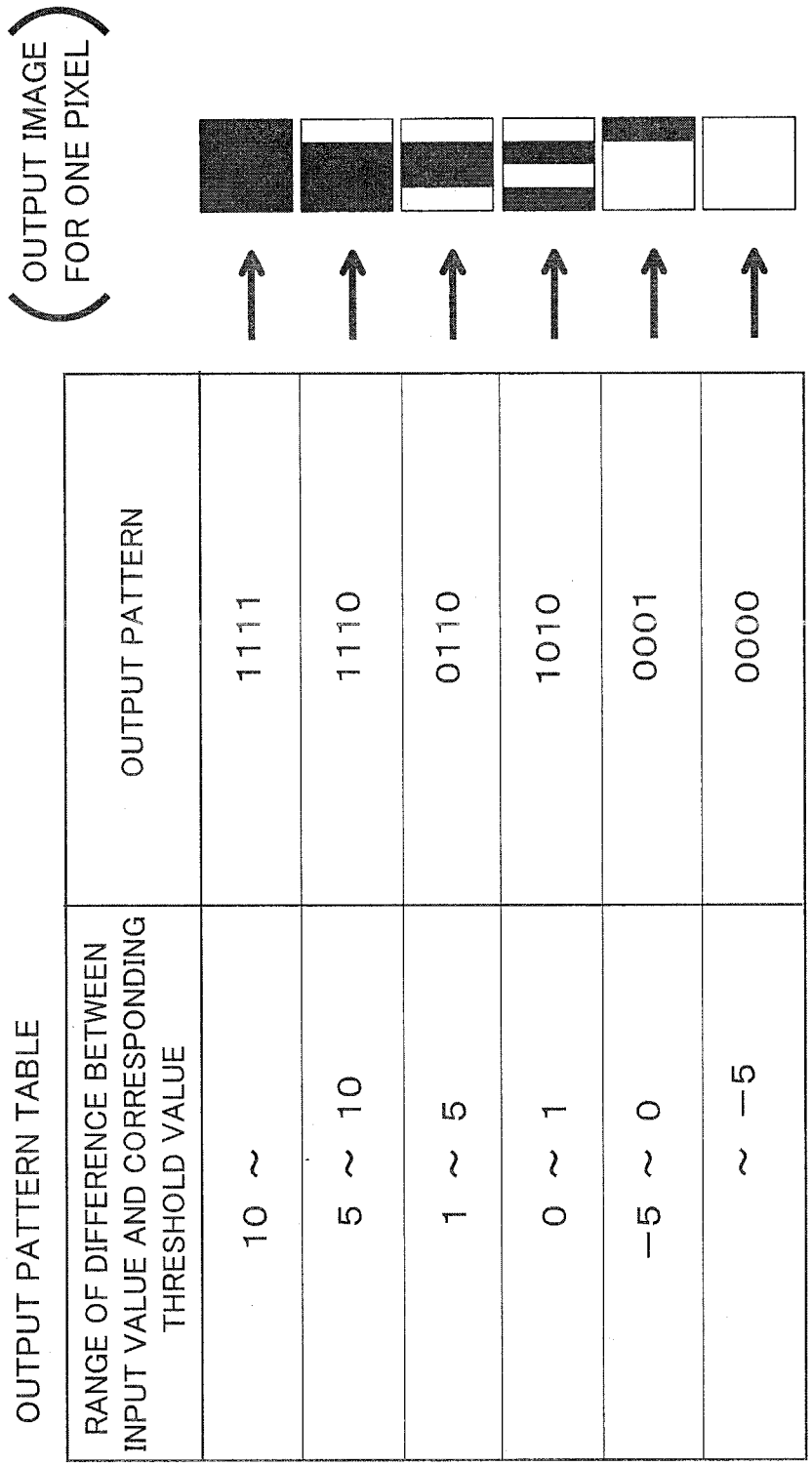
FIG. 5 shows an example of output pattern table stored in a printing control unit according to a second embodiment and output pixel based corresponding to each output pattern.

As shown in FIG. 5, an output pattern table correlates a plurality (six in this example) of differential ranges to cover all possible differences between an input value and its corresponding threshold value, and a plurality (six in this example) of output patterns. Each differential ranges includes one of the plurality of difference related values. The output pattern table is stored in the HDD 14 in advance. The output pattern in the second embodiment is a combination of on/off values for the m blocks in an output pixel. In other words, the output pattern indicates which of the m blocks 62 constituting a single output pixel (see FIG. 2) are to be turned on and off, i.e., the order and arrangement of dots that are on and off. In the output patterns shown in FIG. 5, a "1" indicates on and a "0" indicates off. Output images formed on recording paper based on these output patterns are also given in FIG. 5 next to the corresponding patterns. As in the first embodiment described above, the following description of the second embodiment will assume that one output pixel includes four blocks 62.

In the second embodiment, the PC 10 generates print data by setting one output pattern for each differential corresponding to each input pixel (input value–threshold value) based on the correlations in the output pattern table. Based on this print data, the control unit 50 (see FIG. 1) outputs a PWM signal to the scanning unit 48 instructing the laser to be on for a "1" in the output pattern and off for a "0" in the output pattern, thereby forming output pixels arranged in an on/off order that corresponds to the output pattern on recording paper.

As described above, a higher density can be rendered in an output pixel by setting more dots in the output pixel to on. However, when the ON dots are dispersed throughout an output pixel formed on recording paper, the colorant is more difficult to fix to the paper than when the ON dots are clustered together, and the dispersed dots have a tendency to appear relatively lighter than the clustered dots. Accordingly, an output pixel may appear to have a different density depending on whether the ON dots are dispersed or clustered, even when the number of ON dots is the same. Therefore, by preparing the output pattern table that correlates output patterns indicating combinations of dispersed ON dots with differential ranges equivalent to lighter colors and that correlates output patterns indicating combinations of clustered ON dots with ranges of differentials equivalent to darker colors, the subtle differences in both light and dark colors can be rendered, even when the number of ON dots is the same. For example, in the output pattern table shown in FIG. 5, both the output pattern corresponding to the differential range "1-5"

and the output pattern corresponding to the differential range "0-1" include two "1" values representing ON dots. However, the difference in gradation between the lighter and darker colors can be rendered by assigning the output pattern "1010" with its combination of dispersed ON dots to the differential range "0-1" corresponding to the lighter color and assigning the output pattern "0110" with its combination of clustered ON dots to the differential range "1-5" corresponding to the darker color.

While "output pattern" in the second embodiment has been described as data defining the ordered arrangement of ON dots and OFF dots, output pattern may simply be data denoting a combination of a number of ON dots and a number of OFF dots within m blocks.

Figure 6:
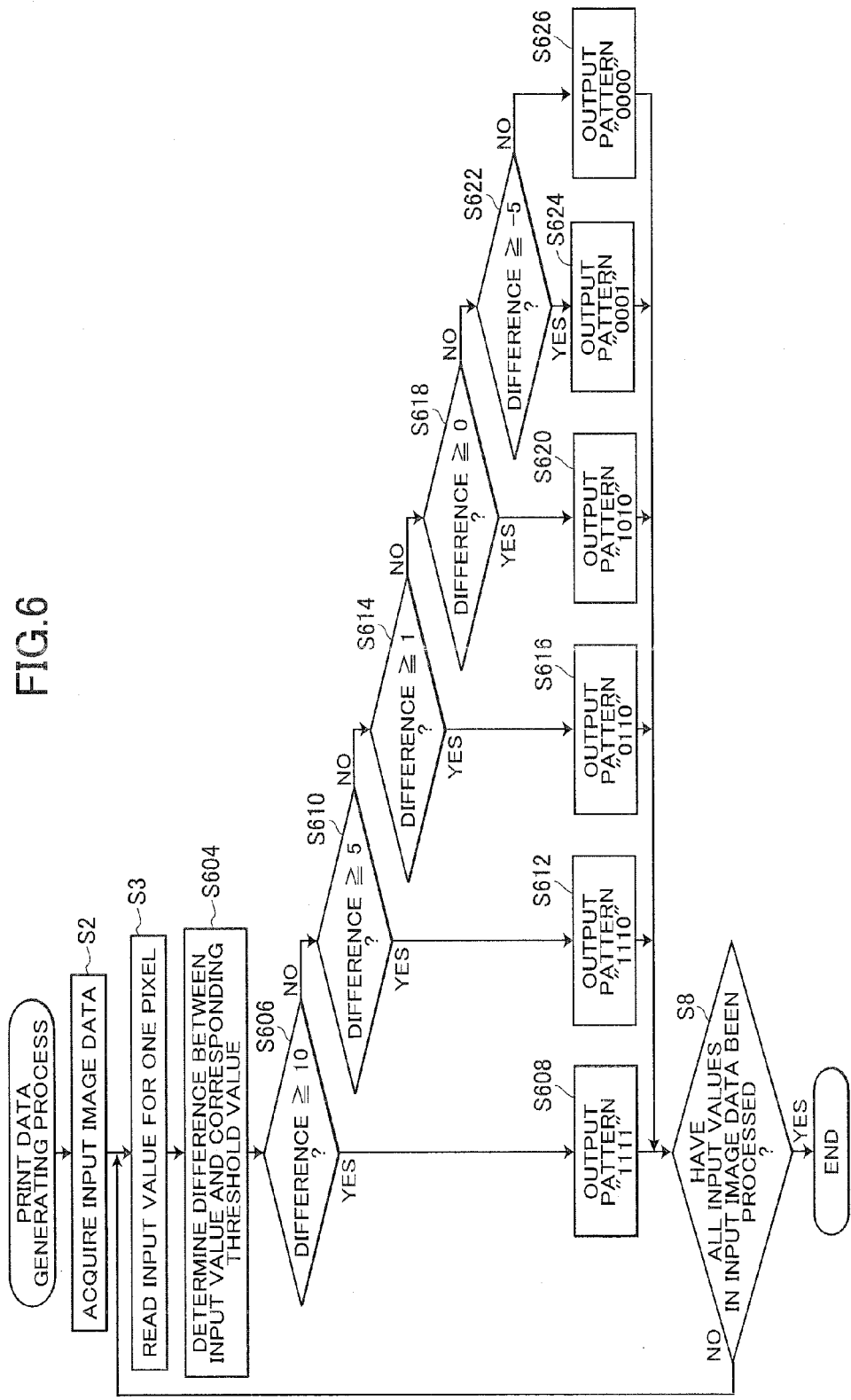
FIG. 6 is a flowchart illustrating steps in a print data generating process executed by the printing control device according to the second embodiment.

FIG. 6 is a flowchart indicating a print data generating process executed on the PC 10 according to the second embodiment in place of the print data generating process of FIG. 3 described in the first embodiment. Steps indicated in FIG. 6 that are identical to steps shown in FIG. 3 have been designated with the same step numbers to avoid duplicating description. First, the CPU 11 acquires the input image data in S2 and reads and acquires an input value for one input pixel (one input pixel data) in S3.

In S604 the CPU 11 references the dither matrix 142 and acquires threshold values assigned to a corresponding element in the dither matrix 142, and determines a difference between the input value and the corresponding threshold value. The threshold values assigned to elements of the dither matrix 142 in the second embodiment also have a one-on-one correspondence to the input pixel data and are compared with the corresponding input values of these input pixels.

In the subsequent process, the CPU 11 determines the range of values to which the difference belongs (differential range) and determines the output pattern based on the determined differential range. First, in S606 the CPU 11 determines whether the difference is greater than or equal to 10. If the difference is at least 10 (S606: YES), in S608 the CPU 11 outputs the output pattern "1111" indicating a combination in which dots contained in all blocks of the output pixel are turned on, and develops this output pattern in the page memory as one output pixel data with bitmap format. In other words, the CPU 11 generates one output pixel data based on the determined output pattern.

However, if the difference is less than 10 (S606: NO), in S610 the CPU 11 determines whether the difference is greater than or equal to 5. If the difference is greater than or equal to 5 (S610: YES), in S612 the CPU 11 outputs the output pattern "1110" indicating that the first three blocks 62 of the output pixel are to be turned on and the last block 62 is to be turned off, and develops this output pattern in the page memory.

However, if the difference is less than 5 (S610: NO), in S614 the CPU 11 determines whether the difference is greater than or equal to 1. If the difference is at least 1 (S614: YES), in S616 the CPU 11 outputs the output pattern "0110" and develops this output pattern in the page memory.

However, if the difference is less than 1 (S614: NO), in S618 the CPU 11 determines whether the difference is greater than or equal to 0. If the difference is greater than or equal to 0 (S618: YES), in S620 the CPU 11 outputs the output pattern "1010", and develops this output pattern in the page memory.

However, if the difference is less than 0 (S618: NO), in S622 the CPU 11 determines whether the difference is greater than or equal to −5. If the difference is greater than or equal to −5 (S622: YES), in S624 the CPU 11 outputs the output pattern "0001" and develops this output pattern in the page memory as bitmap data. However, if the difference is less than −5 (S622: NO), in S626 the CPU 11 outputs the pattern "0000" and develops this output pattern in the page memory.

After setting the output pattern corresponding to a single input value, in S8 the CPU 11 determines whether the process has been completed for all input values of the input image data. The CPU 11 returns to S3 and repeats the above process when there remain unprocessed input values (S8: NO) and ends the print data generating process when all input values have been processed (S8: YES). As in the first embodiment, the CPU 11 according to the second embodiment subsequently supplies the bitmap data generated in the print data generating process to the printer 40 as print data, instructing the printer 40 to print the output image.

As in the first embodiment described above, the PC 10 according to the second embodiment enables the printer 40 to print an output image in which the gradations of the input image are reproduced accurately. Further, the print data generating process according to the second embodiment places little processing load on the PC 10 since the PC 10 can easily determine the output patterns based on the output pattern table.

Next, a third embodiment of the present invention will be described with reference to FIGS. 7(a) through 9. In the second embodiment described above, the PC 10 directly determines output patterns based on differences between input values and corresponding threshold values by referencing the output pattern table storing correlations between the differential ranges and the output patterns. In contrast, the PC 10 of the third embodiment first determines an intermediate pattern corresponding to the difference between an input value and corresponding threshold value and subsequently determines an output pattern corresponding to this intermediate pattern, rather than setting the output pattern directly based on the difference.

In the third embodiment, the HDD 14 stores an intermediate pattern table prepared in advance. As shown in FIG. 7(a), the intermediate pattern table stores correlations between a plurality (six in this example) of differential ranges and a plurality (six in this example) of intermediate patterns P1-P6. Each difference related value range includes one of the plurality of difference related values. Each intermediate pattern indicates a combination of on and off values for n×n intermediate pixels. In the description of the third embodiment, it will be assumed that n=2, but n may be any integer greater than 1, provided that $n^2 \geq m$. Each intermediate pattern stored in the intermediate pattern table is configured of "1" and/or "0" values denoting which of the n×n intermediate pixels is on and off. However, in FIG. 7(a), values indicating an ON intermediate pixel in the intermediate pattern are conceptually illustrated in the intermediate pattern as a ●, while values indicating an OFF intermediate pixel are conceptually illustrated as a ○. Hence, the PC 10 can set an intermediate pattern for each intermediate pixel by looking up the difference between the input value of the pixel and the corresponding threshold value in the intermediate pattern table. As shown in FIG. 7(a), intermediate patterns in the intermediate table having a larger, number of intermediate pixels set to on are correlated with ranges of larger differences.

FIG. 7(b) shows an example of an output pattern table used in the third embodiment. The output pattern table is also stored in the HDD 14 in advance. While the output pattern table used in the second embodiment correlates a plurality of differential ranges with a plurality of output patterns, the output pattern table used in the third embodiment correlates a plurality (six in this example) of intermediate patterns with a plurality (six in this example) of output patterns, as shown in FIG. 7(b).

The PC 10 according to the third embodiment is configured to generate print data by first setting an intermediate pattern corresponding to the difference between an input value and threshold value and subsequently setting an output pattern corresponding to this intermediate pattern.

A method of determining output patterns according to the third embodiment will be described with reference to FIGS. 8(a) through 8(d). First, the PC 10 determines the difference between the input value for each pixel in the input image data shown in FIG. 8(a) and the corresponding threshold value in the dither matrix 142 shown in FIG. 8(b). For example, if the input image data has a resolution of 600 pixels per inch (ppi) both vertically and horizontally, the PC 10 determines differences using threshold values in the dither matrix 142 having the same resolution. In FIGS. 8(a) through 8(d), resolution will be described as vertical resolution (or resolution in the paper-conveying direction)×horizontal resolution (or resolution in the laser-scanning direction).

Figure 8A:
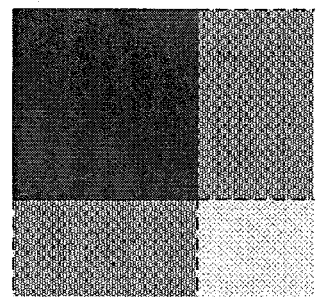
FIG. 8(*a*) is an explanatory diagram showing a part of input image data.
Figure 8B:
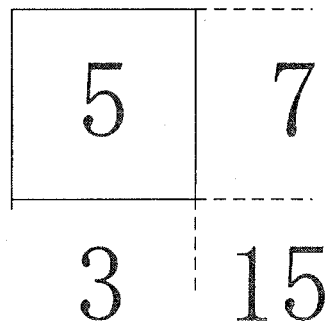
Figure 8C:
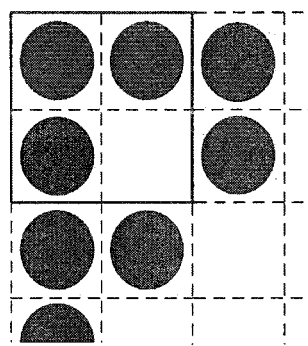

Next, the PC 10 determines an intermediate pattern for each of the differences determined above based on the intermediate pattern table shown in FIG. 7(a). As shown in FIG. 8(c), each intermediate pattern has data indicating the on/off states of intermediate pixels constituting bitmap data, which bitmap data has a resolution n times the resolution of the input image data in the vertical direction and n times the resolution of the input image data in the horizontal direction. Since n=2 in the example shown in FIG. 8(c), the intermediate pattern is treated as 1200×1200 ppi bitmap data.

Figure 8D:
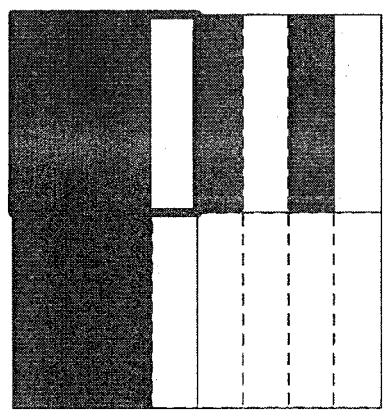

Next, the CPU 11 determines a corresponding output pattern based on each determined intermediate pattern by referring to the output pattern table in FIG. 7(b). In other words, the intermediate pattern indicates which of the intermediate pixels is to be turned on. FIG. 8(d) shows the on/off states of dots corresponding to the determined output pattern. As in the first and second embodiments described above, the printer 40 according to the third embodiment can control the on/off states of the blocks 62 based on the PWM signal, where the blocks 62 are divisions of a single output pixel juxtaposed in the laser scanning direction. Hence, the printer 40 can form dots at a resolution of 600×2400 dots per inch (dpi).

Accordingly, a density similar to the density represented in the intermediate pattern can be reflected in the output pixel. As an example, since the intermediate pattern surrounded by a bold line in FIG. 8(c) has three of its four intermediate pixels set to on, the PC 10 determines an output pattern in which three of the four blocks 62 in the output pixel data are turned on, thereby forming an output pixel at a density corresponding to the difference between the input value and the threshold value.

Next, a print data generating process in the third embodiment will be described with referring to FIG. 9. The CPU 11 acquires the input image data in S2 and reads an input value for one pixel in S3. The input image data acquired in S2 will be assumed to correspond to a 600×600 dpi input image in this description.

In S904 the CPU 11 references the dither matrix 142 and acquires a value assigned to a corresponding element in the dither matrix 142 as the threshold value, and determines a difference between the input value and the corresponding threshold value. In S906 the CPU 11 determines whether the difference is greater than or equal to 10.

If the difference is greater than or equal to 10 (S906: YES), in S908 the CPU 11 outputs the intermediate pattern P1 (see FIG. 7(a)) indicating a combination in which all of the 2×2 intermediate pixels are on.

However, if the difference is less than 10 (S906: NO), in S910 the CPU 11 determines whether the difference is greater than or equal to 5. If the difference is greater than or equal to 5 (S910: YES), in S912 the CPU 11 outputs the intermediate pattern P2 shown in FIG. 7(a).

However, if the difference is less than 5 (S910: NO), in S914 the CPU 11 determines whether the difference is greater than or equal to 1. If the difference is greater than or equal to 1 (S914: YES), in S916 the CPU 11 outputs the intermediate pattern P3 shown in FIG. 7(a).

However, if the difference is less than 1 (S914: NO), in S918 the CPU 11 determines whether the difference is greater than or equal to 0. If the difference is greater than or equal to 0 (S918: YES), in S920 the CPU 11 outputs the intermediate pattern P4 shown in FIG. 7(a).

However, if the difference is less than 0 (S920: NO), in S922 the CPU 11 determines whether the difference is greater than or equal to −5. If the difference is greater than or equal to −5 (S922: YES), in S924 the CPU 11 outputs the intermediate pattern P5 shown in FIG. 7(a). However, if the difference is less than −5 (S922: NO), in S926 the CPU 11 outputs the intermediate pattern P6 shown in FIG. 7(a).

After setting an intermediate pattern corresponding to one input value in this way, in S928 the CPU 11 determines an output pattern indicating a combination of on/off settings for m blocks that corresponds to the intermediate pattern set above, based on the output pattern table (see FIG. 7(b)), and stores this output pattern in the page memory as bitmap data. In S8 the CPU 11 determines whether the process has been completed for all input values of the input image data. The CPU 11 returns to S3 and repeats the above process when there remain unprocessed input values (S8: NO) and ends the print data generating process when all input values have been processed (S8: YES). As in the first and second embodiments, the CPU 11 according to the third embodiment subsequently supplies the bitmap data generated in the print data generating process to the printer 40 as print data, instructing the printer 40 to print the output image.

As in the first and second embodiments, the PC 10 according to the third embodiment can control the printer 40 to print an output image in which the gradations of the input image are reproduced accurately. Further, as in the second embodiment, the print data generating process according to the third embodiment places little processing load on the PC 10 for determining output patterns since the PC 10 can easily set an intermediate pattern based on the prepared intermediate pattern table and can subsequently easily set an output pattern based on the prepared output pattern table.

While the PC 10 according to the third embodiment determines an output pattern corresponding to an intermediate pattern based on the output pattern table (see FIG. 7(b)), the PC 10 may be provided with firmware or the like for determining output patterns that correspond to input patterns and may be configured to determine output patterns using this firmware. Specifically, by forming 600×2400 dpi images, such as that shown in FIG. 8(d), the printer 40 is forming high-resolution images on the order of 1200×1200 ppi. Hence, in some cases the printer 40 or printer driver 141 may be provided with a function for forming high-resolution images using this relationship between intermediate patterns and output patterns.

More specifically, in this case the resolution of 600×600 ppi multi-value image data (KGB data) is converted to 1200×1200 ppi multi-value image data, after which the 1200×1200 ppi multi-value image data is converted to 1200×1200 ppi K (or CMYK) image data. Next, the K image data is converted to binary image data using a dither matrix corresponding to the 1200×1200 ppi K image data. By subsequently converting this binary image data to 600×2400 dpi binary image data using the relationships between intermediate patterns and output patterns, as illustrated in the output pattern table of FIG. 7(b), the printer 40 can be instructed to print a 600×2400 dpi image. In this case, firmware or the like is already in place for determining output patterns corresponding to intermediate patterns and for executing a printing process. Hence, the invention according to the third embodiment can be configured to effectively utilize existing firmware and the like for setting output patterns corresponding to intermediate patterns.

While the invention has been described in detail with reference to the embodiments thereof, it would be apparent to those skilled in the art that various changes and modifications may be made therein without departing from the spirit of the invention.

For example, in the first, second, and third embodiments described above, the CPU 11 performs the print data generating processes shown in FIGS. 3, 6, and 9. However, the CPU 41 may perform these print data generating processes.

Further, the printer 40 may employ any type printer, such as an inkjet printer.

In Equation (1) used in the first embodiment, the maximum input value is the largest value that can be used as an input value. However, the maximum input value may be set to one more than the largest value that can be used for an input value, for example. Further, the dot-on-ratio may be determined according to different operations than those described in Equations (1) and (2), provided that the value is related to the difference between the input value and the corresponding threshold. For example, the dot-on-ratio may be calculated according to Equations (3) through (5) below.

When input value>threshold, $$\text{dot-on-ratio}=[(\text{input value}-\text{threshold})/(\text{maximum input value}-\text{threshold})+\text{constant}]\times\text{coefficient} \quad (3)$$

When input value=threshold, $$\text{dot-on-ratio}=(0+\text{constant})\times\text{coefficient} \quad (4)$$

When input value<threshold, $$\text{dot-on-ratio}=[(\text{input value}-\text{threshold})/\text{threshold}+\text{constant}]\times\text{coefficient} \quad (5)$$

In the first, second, and third embodiments described above, the CPU 11 generates print data for producing gradations in each output pixel by varying the number of blocks in the output pixel set to on based on a value related to a differential, such as the dot-on-ratio or the difference between the corresponding input value and threshold value, but the present invention is not limited to this specific method of adjusting gradations in output pixels. For example, the same effects described in the first, second, and third embodiments can be obtained when generating print data that selectively uses both light colorant and dark colorant or that selectively uses large dots, medium dots, and small dots based on a differential-related value.

Further, threshold values of dither matrix 142 are used in the print data generating processes of the first, second, and third embodiments, but it is not necessary to use threshold values in a dither matrix, provided that the threshold values are positive. For example, the PC 10 may be configured to use a prescribed constant value as the threshold value for each input pixel when processing input values, such as the threshold value of 125 when input values can be set to one of 255 gradations.

While the first, second, and third embodiments describe a printer 40 that prints monochromatic images, the present invention may also be applied to a printer 40 capable of printing color images. In this case, the PC 10 converts the original image data to input image data by converting the R (red), G (green), and B (blue) values in the original image data to values expressing the gradation (density) of each color component used by the printer 40 (such as C, M, Y, and K values for the colors cyan, magenta, yellow, and black) according to a process well known in the art. The resulting input image data can then be separated into each of the C, M, Y, and K color components, for example. Each image corresponding to input image data for a separated color component is equivalent to the input image of the present invention. Further, each of the values expressing a gradation for a color component (such as the C, M, Y, and K values, for example) corresponds to the input value of the present invention. The PC 10 converts the input image data for each color component to output image data indicating which dots are on and off for each color according to the same print data generating processes described above (FIGS. 3, 6, and 9), and outputs this output image data to the printer 40 as print data. The printer 40 can then print a color image by superimposing the output images for each color component. Through this application of the present invention, the gradations of input pixels for each color component can be faithfully reproduced in output pixels for each corresponding color component constituting the color image.

In the first embodiment, the dot-on-ratio is calculated based on the difference between the input value and threshold value. However, it is also possible to prepare a table that correlates differences between input values and threshold values and dot-on-ratios and to set the dot-on-ratio by referencing this table.

While the differential value is found in S604 by subtracting the threshold value from the input value in the second embodiment, the CPU 11 may instead find a related value such as the dot-on-ratio calculated in the first embodiment.

Further, in the second and third embodiment, the differential ranges have a one-on-one correspondence with the output patterns and the intermediate patterns, respectively. However, values of difference between the input value and corresponding threshold value may have a one-on-one correspondence with the output patterns and the intermediate patterns.

What is claimed is:

1. A printing control device comprising:
   an input image data acquiring unit that acquires input image data, the input image data including a plurality of input pixel data, each input pixel data having an input value;
   a determining unit that determines, for each input pixel data, a difference related value based on a difference between the input value and a threshold value corresponding to the input value; and
   a generating unit that generates print data by generating, for each input pixel data, output pixel data based on the difference related value, the output pixel data expressing density corresponding to the difference related value, each output pixel data including m blocks, m being an integer greater than one;
   a first correlation storing unit that stores correlations between a plurality of related values and a plurality of intermediate patterns; and
   a second correlation storing unit that stores correlations between the plurality of intermediate patterns and a plurality of output patterns, each output pattern indicating which of m blocks are to be turned on,
   wherein the generating unit comprises:

an intermediate pattern determining unit that determines, for each input pixel data, one of the intermediate patterns based on the difference related value; and an output pattern determining unit that determines, for each input pixel data, one of the output patterns based on the intermediate pattern, and wherein the generating unit generates the print data by generating, for each input pixel data, the output pixel based on the determined output pattern.

2. The printing control unit according to claim 1, further comprising a dither matrix storing unit that stores a dither matrix including a plurality of elements, each element having a value, and wherein each input pixel data corresponds to one value of the element as the threshold value.

3. The printing control unit according to claim 2, wherein each input pixel data corresponds to one element of the dither matrix.

4. The printing control device according to claim 1, wherein each output pixel data indicates whether to turn on or off each of a plurality of blocks, and wherein the generating unit generates the print data by generating, for each input pixel data, the output pixel data including turned-on blocks whose number corresponds to the difference related value.

5. The printing control device according to claim 4, wherein the determining unit determines, for each input pixel data, a dot-on-ratio based on the difference between the input value and the threshold value as the difference related value, and wherein the generating unit generates the print data by generating, for each input pixel data, the output pixel data including the turned-on blocks whose number corresponds to the dot-on ratio.

6. The printing control device according to claim 1, wherein each output pixel data includes a plurality of blocks, wherein the printing control device further comprises:

a correlation storing unit that stores correlations between a plurality of difference related values and a plurality of output patterns, each of the output patterns indicating which of blocks are to be turned on, wherein the generating unit determines, for each input pixel data, one of the output patterns based on the difference related value determined by the determining unit, and wherein the generating unit generates the print data by generating, for each input pixel data, the output pixel data based on the determined output pattern.

7. The printing control device according to claim 6, wherein the determining unit determines, for each input pixel data, the difference between the input value and the threshold value as the difference related value.

8. The printing control device according to claim 6, wherein the correlation storing unit stores correlations between a plurality of difference related value ranges and the plurality of output patterns, each of the difference related value ranges corresponding to one of the output patterns and including one of the plurality of difference related values.

9. The printing control unit according to claim 1, wherein each of the intermediate patterns includes n×n intermediate pixels and indicates which of the intermediate pixels is to be turned on, n being an integer greater than one, $n^2$ being greater than or equal to m.

10. The printing control device according to claim 1, wherein the first correlation storing unit stores correlations between a plurality of difference related value ranges and the plurality of intermediate patterns, each of the difference related value ranges corresponding to one of the intermediate patterns and including one of the plurality of difference related values.

11. A printing device comprising:
the printing control device according to claim 1; and
a printing unit that prints an output image based on the print data, the output image including a plurality of output pixels corresponding to the plurality of output pixel data, each output pixel reproducing the density corresponding to the related value for the output pixel data.

12. A printing control method comprising:
acquiring input image data, the input image data including a plurality of input pixel data, each input pixel data having an input value;
determining, for each input pixel data, a difference related value based on a difference between the input value and a threshold value corresponding to the input value;
generating, for each input pixel data, output pixel data based on the difference related value, the output pixel data expressing density corresponding to the difference related value, each output pixel data including m blocks, m being an integer greater than one;
storing correlations between a plurality of related values and a plurality of intermediate patterns; and
storing correlations between the plurality of intermediate patterns and a plurality of output patterns, each output pattern indicating which of m blocks are to be turned on,
wherein the generating comprises:
determining, for each input pixel data, one of the intermediate patterns based on the difference related value; and
determining, for each input pixel data, one of the output patterns based on the intermediate pattern, and
wherein the output pixel for each input pixel data is generated based on the determined output pattern.

13. A non-transitory computer-readable recording medium that stores a printing control program, the printing control program comprising instructions for:
acquiring input image data, the input image data including a plurality of input pixel data, each input pixel data having an input value;
determining, for each input pixel data, a difference related value based on a difference between the input value and a threshold value corresponding to the input value;
generating, for each input pixel data, output pixel data based on the difference related value, the output pixel data expressing density corresponding to the difference related value, each output pixel data including m blocks, m being an integer greater than one;
storing correlations between a plurality of related values and a plurality of intermediate patterns; and
storing correlations between the plurality of intermediate patterns and a plurality of output patterns, each output pattern indicating which of m blocks are to be turned on,
wherein the generating comprises:
determining, for each input pixel data, one of the intermediate patterns based on the difference related value; and
determining, for each input pixel data, one of the output patterns based on the intermediate pattern, and
wherein the output pixel for each input pixel data is generated based on the determined output pattern.

* * * * *